United States Patent [19]

Williams

[11] Patent Number: 4,841,792

[45] Date of Patent: Jun. 27, 1989

[54] VARIABLE LOADING ROLLER

[75] Inventor: Daniel M. Williams, Oliver Springs, Tenn.

[73] Assignee: The United States of America as represented by the United States Department of Energy, Washington, D.C.

[21] Appl. No.: 146,644

[22] Filed: Jan. 21, 1988

[51] Int. Cl.⁴ .............................................. F16H 13/14
[52] U.S. Cl. .............................................. 74/208; 74/569
[58] Field of Search ................... 74/208, 569; 192/54, 192/93 A

[56] References Cited

U.S. PATENT DOCUMENTS

| | | | |
|---|---|---|---|
| 1,416,905 | 5/1922 | Stoeckicht | 74/208 |
| 1,775,479 | 9/1930 | Arter | 74/208 X |
| 2,123,008 | 7/1938 | Hayes | 74/208 |
| 3,283,614 | 11/1966 | Hewko | 74/208 X |
| 4,483,216 | 11/1984 | Takahashi et al. | 74/208 X |

FOREIGN PATENT DOCUMENTS

| | | | |
|---|---|---|---|
| 837117 | 11/1938 | France | 74/208 |
| 481475 | 5/1953 | Italy | 74/208 |

Primary Examiner—Allan D. Herrmann
Attorney, Agent, or Firm—Stephen D. Hamel; Judson R. Hightower

[57] ABSTRACT

An automatic loading roller for transmitting torque in traction drive devices in manipulator arm joints includes a two-part camming device having a first cam portion rotatable in place on a shaft by an input torque and a second cam portion coaxially rotatable and translatable having a rotating drive surface thereon for engaging the driven surface of an output roller with a resultant force proportional to the torque transmitted. Complementary helical grooves on the respective cam portions interconnected through ball bearings interacting with those grooves effect the rotation and translation of the second cam portion in response to rotation of the first.

4 Claims, 8 Drawing Sheets

F = NORMAL FORCE
$F_T$ = TANGENT FORCE
$F_L$ = GENERATED THRUST FORCE
$T_i$ = INPUT TORQUE
$T_o$ = OUTPUT TORQUE

VARIABLE LOADING ROLLER

FIELD OF THE INVENTION

This invention relates to the force rollers for use in telerobotic manipulator arm joints and more particularly to an automatic loading roller mechanism or producing a varying normal loading in between the differential traction drive roller of a telerobotic joint that is proportional to the transmitted torque.

BACKGROUND OF THE INVENTION

Classically, the performance features of teleoperators dictate a mechanical approach that is mutually exclusive of the mechanical approach used to make high performance robots. Attempts to merge these two technologies into a telerobot have been unsuccessful due to the strict limitations imposed by each of these contradictory mechanical approaches. A new approach has been needed that provides the advantages of very low friction as in teleoperators while exhibiting high stiffness and zero backlash as in robots.

In achieving this objective, there is a need for an automatic loading mechanism which produces varying normal loads between differential traction drive rollers such as those that are used in manipulator arm joints. In order to insure adequate traction with minimum friction loss, the resulting in normal load must be proportional to the input and output torques.

It is therefore an object of the present invention to provide a new and novel automatic loading mechanism which comprises a variable loading roller producing a varying normal load between the differential traction drive rollers of a telerobotic joint, which varying normal load is proportional to the transmitted torque.

Another object of the present invention is to provide a variable loading drive roller for telerobotic joints and the like utilizing a unique ball and cam groove drive between fixed and movable portions of a cam means to effectuate the varying normal load proportional to the transmitted torque.

These and other objects of the present invention will become more fully apparent with reference to the following specification and drawings which relate to several preferred embodiments of the present invention.

BRIEF DESCRIPTION OF THE DRAWINGS

FIG. 11 is a schematic structural diagram of a variable loading input roller for use in telerobotic manipulator joints and the like;

SUMMARY OF THE INVENTION

Figure 1:
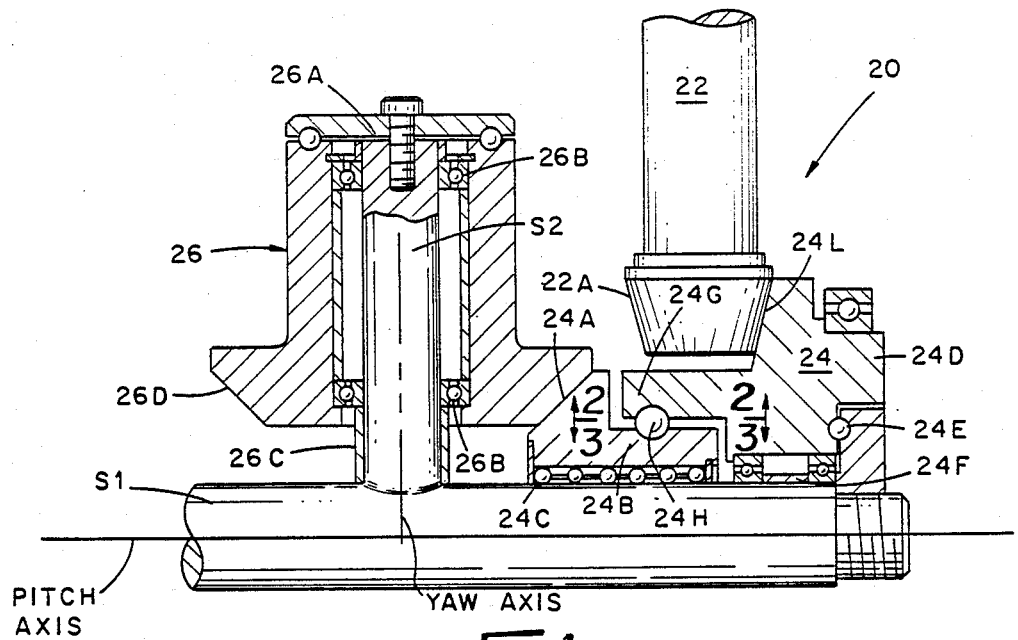
FIG. 1 is a partial cross section of an enlarged detail illustrating a first embodiment of the variable roller of the present invention.

The variable loading roller means of the present invention comprises an input torque transmitting roller means for transmitting input torque and an output torque transmitting roller means engaged with and responsive to the input torque transmitting roller means for providing an output torque. The input torque transmitting roller means includes variable loading means responsive to the input torque to cause the input and output torque transmitting roller means to be engaged with a resultant loading proportional to the torque transmitting thereby. The variable loading means comprises cam means for effecting the said loading which includes a fixed cam portion and a traversing cam portion mounted for rotation about a common axis. The fixed cam portion is mounted for in place rotation about the common axis while the traversing cam portion is mounted both for rotation about that axis and for axial displacement thereon relative to the said fixed cam portion. Complementary opposing reaction surface configurations are formed in the cam portions and cooperate with ball bearings or other bearing means engaged therewith to transmit torque between said cam portions and generate an axial force from the fixed cam portion to the traversing cam portion as a function of the transmitting torque. This traversing cam portion carries the friction drive surface of the input torque transmitting roller means which is thus forced against the drive surface of the output roller with a loading proportional to the torque transmitted.

In a first preferred embodiment of the present invention, the ball bearings interact with complementary reaction surfaces defined by constant depth surface grooves each formed by intersecting left and right hand helices. In a second preferred embodiment of the present invention the ball bearings with complementary reaction surfaces formed as surface grooves of varying depth, each of which varies to a maximum depth at an apex defined by the intersection of left and right hand helical surfaces. The maximum width of the surface grooves in either embodiment is slightly less than the radius of the ball bearing associated therewith.

DETAILED DESCRIPTION OF THE DRAWINGS

Referring in detail to the drawings and with particular reference to FIG. 1, a first preferred embodiment of the variable loading roller mechanism of the present invention is illustrated in connection with a manipulator joint 20 having input roller assemblies 22, driving intermediate roller assemblies 24 comprising the present invention, which in turn, drive a pitch yaw roller 26 to complete the mechanical interaction of the manipulator joint 20 to the extent illustrated. Each intermediate roller assembly 24 is mounted with its axis of revolution coincident with the pitch axis of the joint on a first shaft S1 while the pitch yaw roller assembly is mounted with its axis of rotation coincident with the yaw axis running through a second shaft S2 fixed to and orthogonally disposed with respect to the first shaft S1.

The pitch/yaw roller 26 is retained on the second shaft S2 for rotation about the yaw axis by means of a thrust bearing assembly 26A at one end of the shaft and a journal bearing assembly at 26B, including spacer sleeves 26C, which position the pitch yaw roller assembly 26 for rotation about a particular part of the second shaft S2.

The operative surface 26D of the pitch yaw roller assembly 26 is engaged with a like operative surface 24A of a traversing roller cam portion 24B of the intermediate roller assembly 24. The traversing cam portion 24B is mounted for axial displacement on the first shaft S1 as well as for rotation about that shaft and the pitch axis, which is coincident with the axis of the shaft S1, by means of a linear and rotary bearing assembly 24C. A fixed cam portion 24D of the intermediate roller assembly 24 is journalled for pure rotation about the axis of the shaft S1 by means of the thrust bearing assembly 24E and a journal bearing assembly 24F, which maintain the fixed roller cam assembly 24D in place on the first shaft S1. A portion 24G of the fixed roller cam portion 24D is externally concentric with and telescoped over a shank portion of the traversing cam roller assembly 24B and the two cam portions are linked together through peripherally disposed cam balls 24H which are engaged in opposing helical grooves 24J and 24K, illustrated in plan view in FIGS. 2 and 3, respectively, which grooves are milled into opposing surfaces in the telescoped portions 24G of the fixed cam roller portion 24D and the shank portion of the traversing cam roller assembly 24B.

Figure 4:
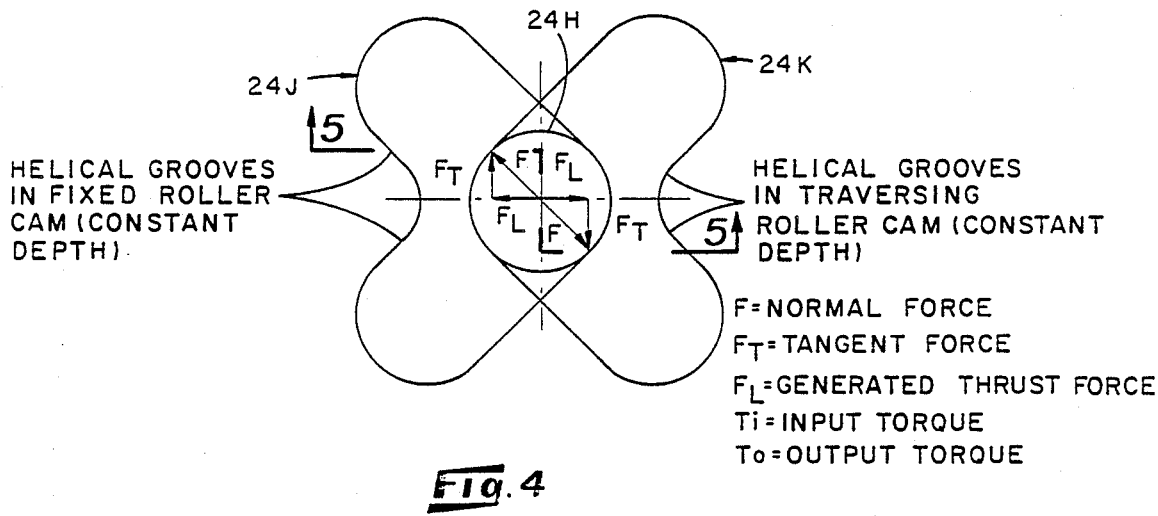
FIG. 4 is an enlarged operational schematic in the form of a free body diagram illustrating the variable loading mechanism of the present invention as utilized i the embodiment of FIG. 1.
Figure 5:
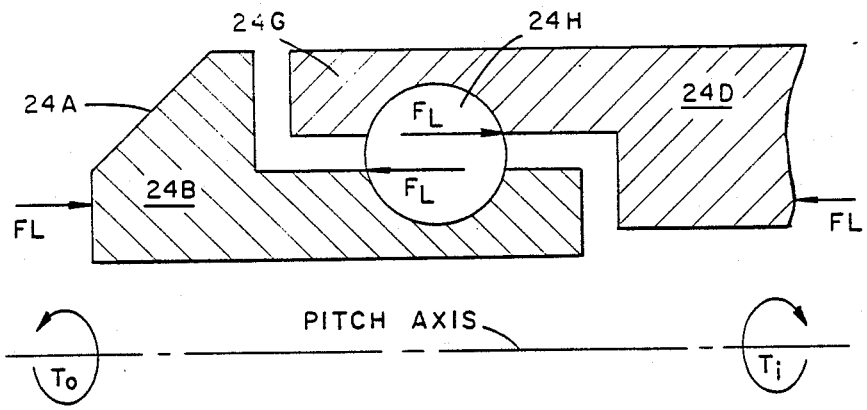
FIG. 5 is an enlarged free body cross section in partial schematic form of the enlarged schematic detail of FIG. 4.

Referring to FIGS. 4 and 5, the interaction between the cam balls 24H and the helical groove 24J and 24K is illustrated. It should be noted that the helical grooves are of a constant depth in this embodiment and that the side or boundary defining surfaces of the grooves 24J and 24K act as cam surfaces with which the cam balls 24H interact.

As indicated in FIG. 4, F=normal force, $F_T$=tangent force, $F_L$=generated force, $T_i$=input torque and $T_o$=output torque. A vector diagram bearing the respective normal, tangent and generated thrust forces F, $F_T$ and $F_L$, respectively, is illustrated in FIG. 4 in plan view to show the vector relationships and the actual generated thrust force component $F_L$ is illustrated in FIG. 5 as running parallel to the pitch axis. Therefore, when an input torque is applied through the input roller 22 the active surface 22A of the input roller 22 engages the active surface 24L of the fixed roller cam portion 24D of the intermediate roller assembly 24 and imparts an input torque $T_i$ to the fixed roller cam 24D about the pitch axis as illustrated in FIGS. 1 and 5. As a result, the helical camming groove 24K imposes a driving force on the cam balls 24H which in turn transmit a force to the boundary cam surfaces of the helical grooves 24J to cause a resultant thrust force $F_L$ to take place and force the traversing roller cam portion 24B axially of the shaft S1 along the pitch axis to thereby change the thrust of the reaction surface 24A of the traversing roller cam 24B against the reactive surface 26D of the pitch/yaw roller assembly 26. As a result, there is imparted an output torque $T_o$ to the pitch yaw roller 26 and at the same time the engaging force is varied between the reactive surfaces 24A and 26D of the traversing cam portion 24B of the intermediate roller assembly 24 and pitch yaw roller 26, respectively.

This thrust load imparted to the pitch yaw roller by the traversing cam portion 24B of the intermediate roller 24 is proportional to the torque $T_i$ applied at the fixed roller cam portion 24D and insures adequate traction between the respective rollers and minimizes friction loss in the bearings of those rollers.

Figure 2:
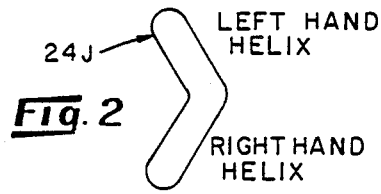
FIG. 2 is an enlarged detail illustrating a cam groove of the present invention taken along line 2—2 of FIG. 1.
Figure 3:
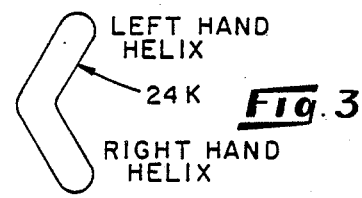
FIG. 3 is an enlarged detail of a second cam groove of the present invention taken along line 3—3 of FIG. 1.

By way of further explanation, each of the contours of the cam grooves 24J and 24K is formed by two converging helical grooves, one cut on a right-hand helix and the other cut on a left-hand helix in the provision of the somewhat V-shaped grooves shown in FIGS. 2, 3 and 4. These helical grooves are machined into surfaces that run parallel to the helix axis to produce contours of constant depth. Thus, as illustrated in the free body diagrams of 4 and 5, the input torque $T_i$ is transmitted from the fixed roller cam portion 24D to the traversing roller cam assembly 24B by a shear force which is generated in each cam ball 24H. This shear force F is normal to the tangent helical groove. This normal force F is the resultant force of the tangential force $F_t$ and a generated force $F_L$. The tangential force $F_t$ is the tangential force required to transmit the input torque $T_i$. The generated force $F_L$ is a varying thrust load that is counteracted by a thrust bearing and bearing retainer 24E on the fixed roller cam portion 24D and is applied to the traversing roller cam assembly 24B which in turn produces a varying normal load between itself and the pitch yaw roller of 26 of FIG. 1, through the reactive surfaces 24A and 26D, respectively.

A second preferred embodiment of the invention, which will be referred to as the variable loading, helical groove, variable depth intermediate roller embodiment will now be described with reference to FIG. 6. In this embodiment a manipulator joint 30 is schematically illustrated as inverted from the manipulator joint 20 of the embodiment of FIGS. 1-5. Basically, however, there is a first shaft S1 through which the pitch axis coaxially extends and a second shaft S2, orthogonal to the first shaft S1, through which the yaw axis coaxially extends in the same manner as those shafts S1 and S2 in the embodiment of FIG. 1. Input rollers 32 are provided having reactive surfaces 32A which are shown as engaging the reactive surfaces 34L of fixed roller cam portions 34D of intermediate roller assemblies 34 in the same general manner as that previously described with respect to the embodiment of FIG. 1. A thrust bearing assembly 34E and journal bearing assembly 34F provide for rotation of each fixed roller cam assembly 34D about the shaft S1 and the pitch axis therethrough at a fixed position on the shaft S1.

In this embodiment, traversing roller cam portions 34B are provided having reactive surfaces 34A and mounted for translation axially of the shaft S1 as well as for rotation thereabout by means of linear and rotary bearing assemblies 34C.

Figure 6:
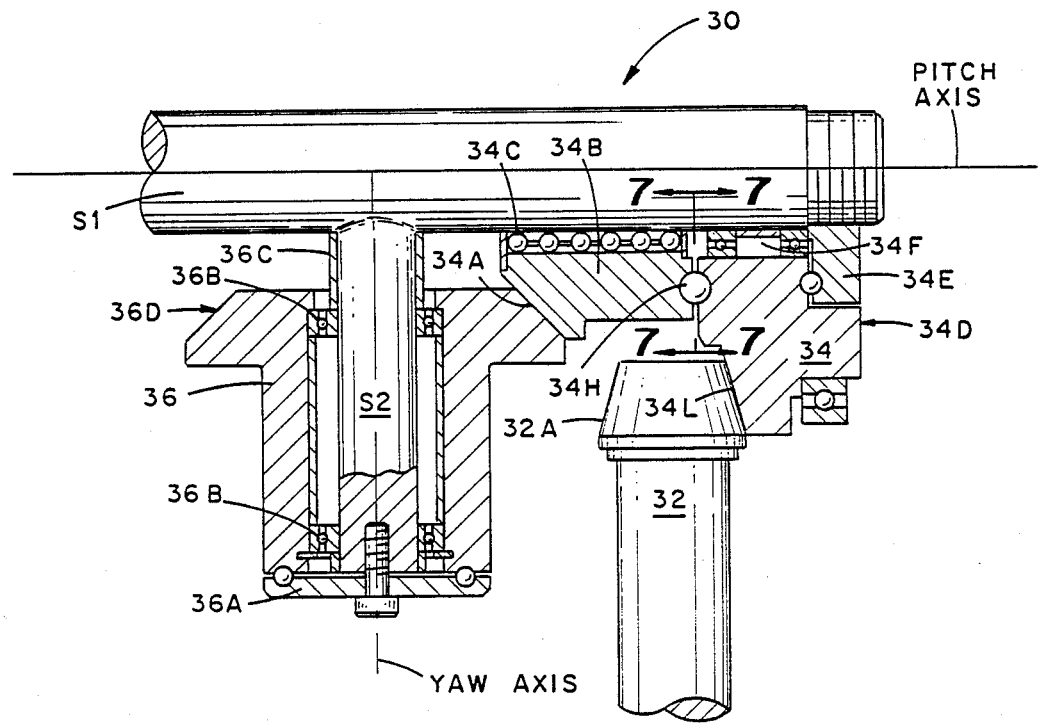
FIG. 6 is an enlarged partial cross sectional view illustrating a second embodiment of the variable roller of the present invention utilizing variable depth helical groove means.
Figure 7:
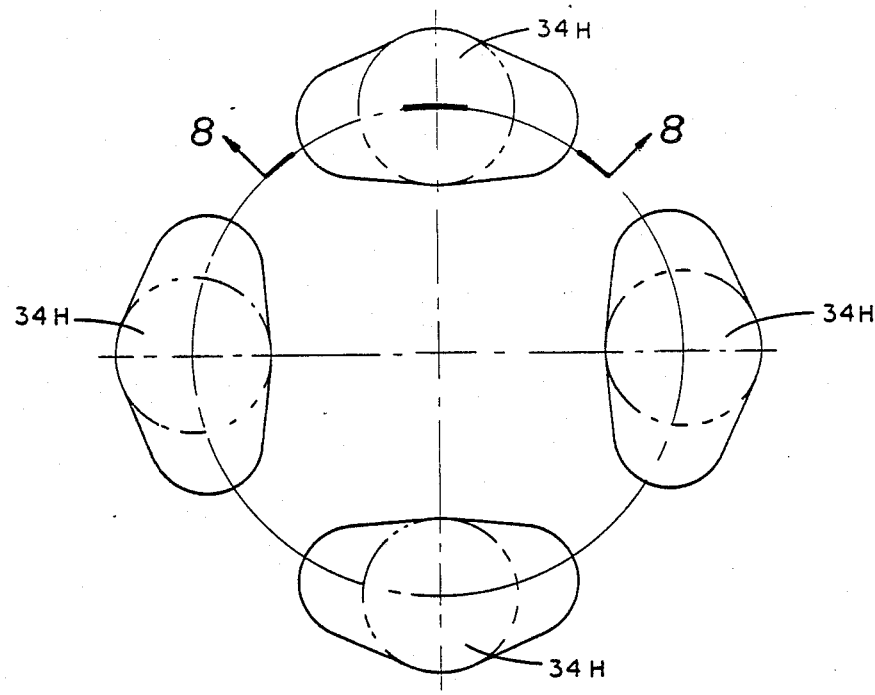
FIG. 7 is an enlarged cam groove detail taken along lines 7—7 of FIG. 6.
Figure 8:
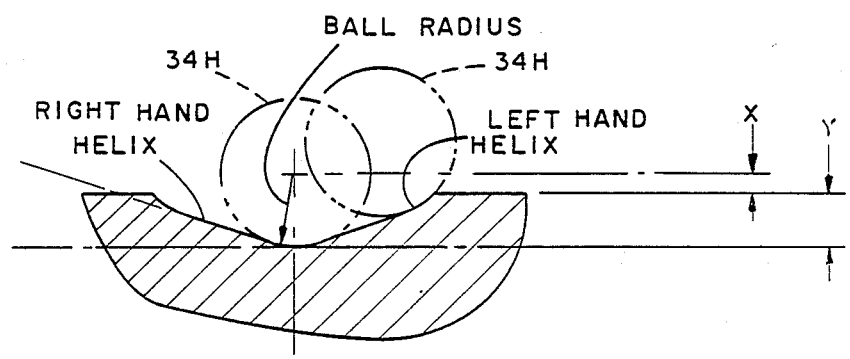
FIG. 8 is an enlarged schematic detail of a cam groove configuration taken along line 8—8 of FIG. 7.

In contrast to the telescoping interrelationship between the traversing and fixed portions of the roller cam in the intermediate roller cam assembly 24 of FIG. 1, the traversing roller cam portion 34B in the present embodiment of FIG. 6 is butted against an end surface of the fixed roller cam portion 34D and the cam balls 34H are confined therebetween in converging helical grooves of varying depth as illustrated in FIGS. 7 and 8.

The manipulator joint assembly 30 is completed to the extent shown by the provision of a pitch/yaw roller 36 mounted for rotation about a fixed portion of the second shaft S2 and the yaw axis therethrough by means of a thrust bearing assembly 36A, journal bearings 36B and spacer sleeve 36C. Thus, the pitch/yaw roller 36 presents a reactive surface 36D to engage with a cooperating reactive surface 34A on the traversing cam portion 34B of the intermediate roller assembly 34 in a manner similar to that previously described to the embodiment of FIG. 1.

Referring now to FIGS. 7 and 8 the cam balls 34H are shown as positioned in grooves of helically varying depth formed by convergent left and right hand helices as indicated in FIG. 8. Opposing similar grooves are machined into opposing surfaces of the traversing roller cam portion 34B and fixed roller cam portion 34D such that rotation of the fixed roller cam portion by the input roller assembly 32 causes an interaction between these grooves and the cam balls 34H to thrust the traversing cam portion 34B along the shaft S1 with a force proportional to the input torque. In this embodiment, the helical grooves 34J and 34K are best illustrated in cooperation with the cam balls 34H in FIG. 9, which is a free body diagram of the intermediate roller cam mechanism illustrating, schematically, the fixed cam portion 34D and the traversing cam portion 34B. The helical grooves 34J and 34K are machined into surfaces that run perpendicular to the helix axis and converge at a depth that is slightly less than the cam ball radius. This produces a tapered contour with varying depth as illustrated in FIGS. 8 and 9.

Figure 9:
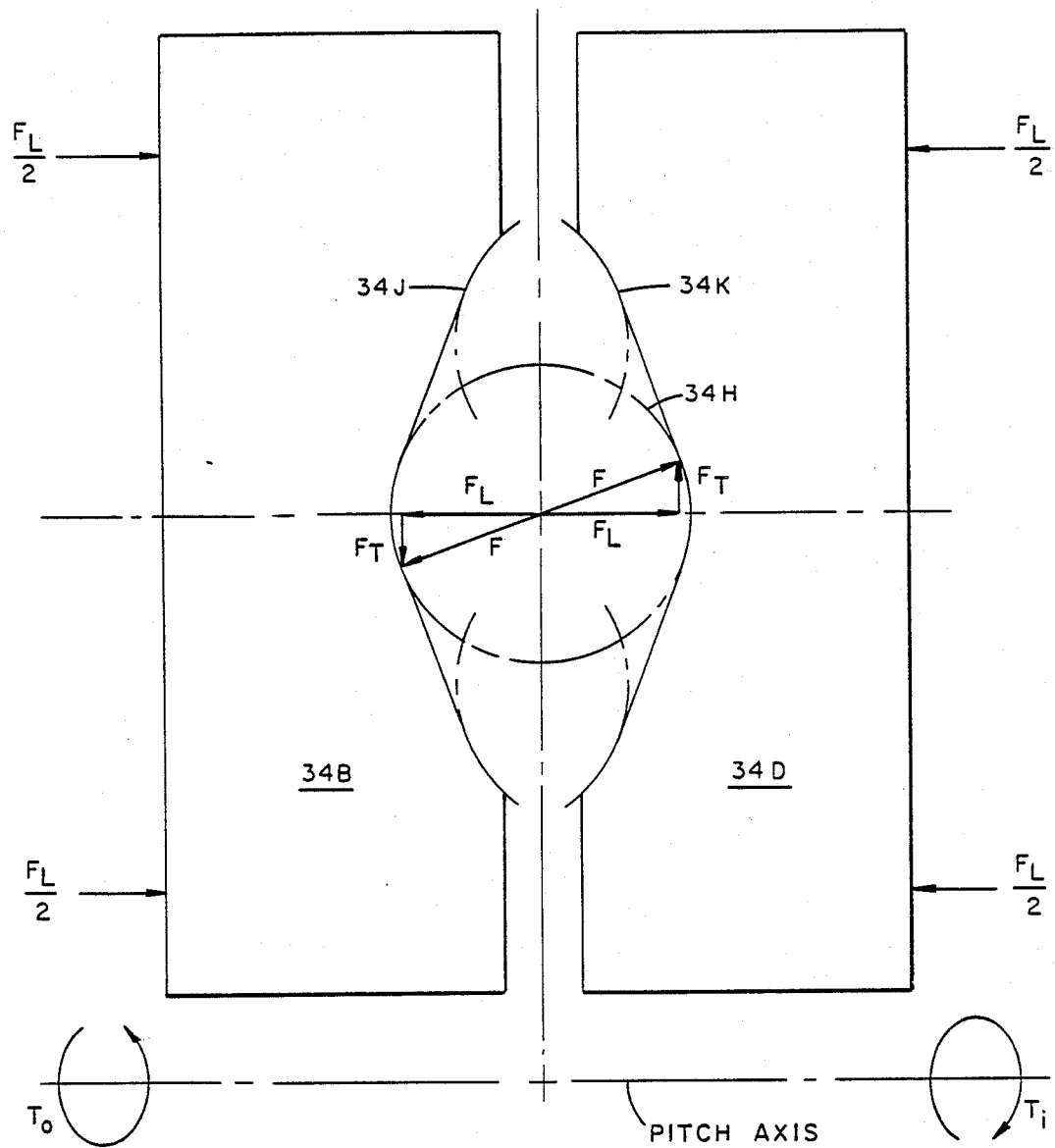
FIG. 9 is a schematic free body diagram of the variable thrust mechanism constituting variable depth helical grooves and a cooperating cam ball of the embodiments of FIGS. 6, 7 and 8.

Referring to the free body diagram of FIG. 9, the input torque $T_i$ is illustrated as being transmitted from the fixed roller cam portion 34D to the traversing roller cam portion 34B by a compressive force F generated in each cam ball. This compressive force F is normal to the tangents of helical grooves 34J and 34K and is the resultant force of a tangential force $F_t$ and generated thrust force $F_L$, the former being the tangential force required to transmit the input torque $T_i$ and the latter being a varying thrust force that is counteracted by a thrust bearing and bearing retainer such as that illustrated at 34E in FIG. 6. As in the embodiment in FIG. 1, this varying thrust load $F_L$ is applied to the traversing roller cam 34B which in turn produces a varying normal load between its own reactive surface and the reactive surface 36D of the pitch/yaw roller 36.

Figure 10:
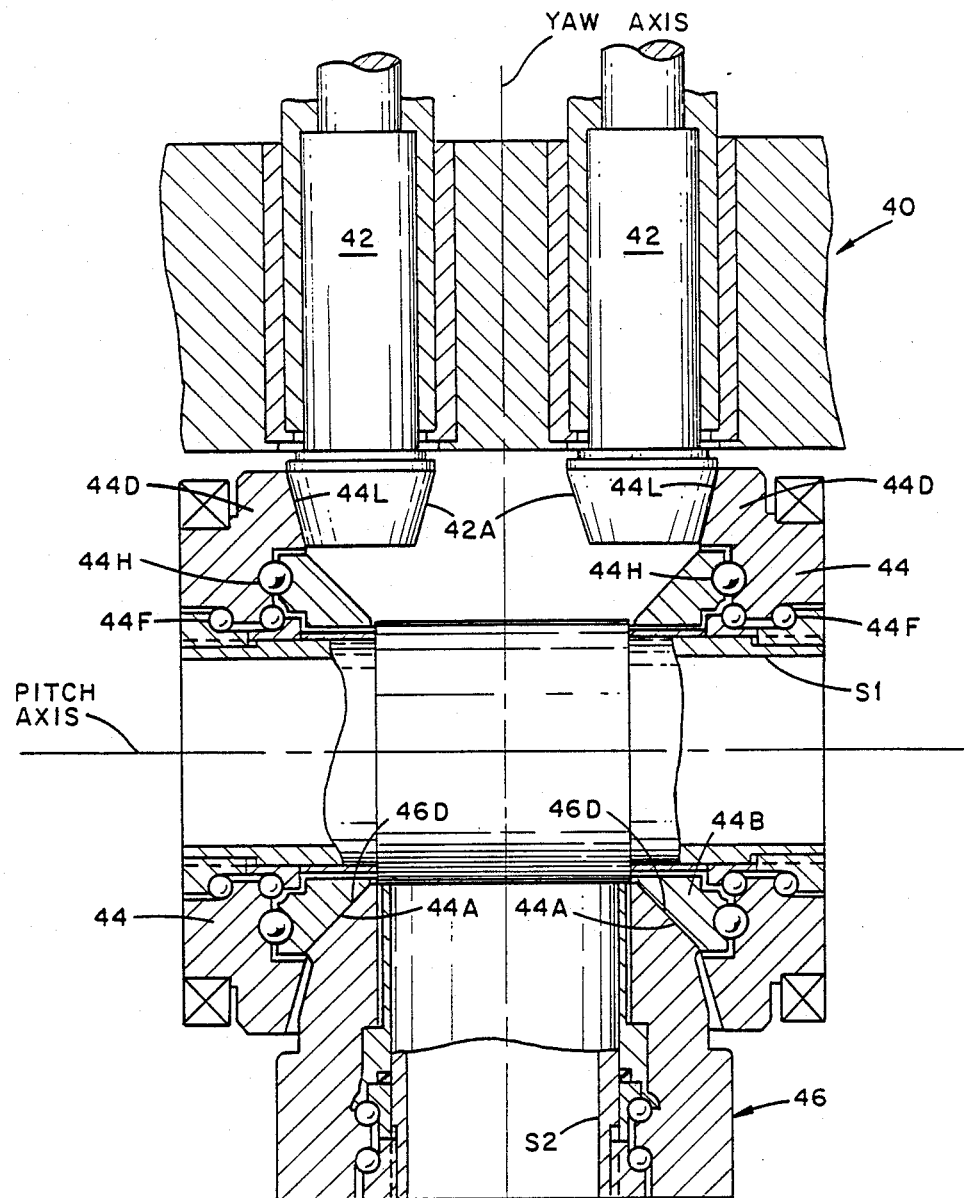
FIG. 10 is a partial cross section structural schematic illustrating an alternate version of the embodiment of FIG. 6.

To lend additional perspective to the present invention, a more complete schematic of a telerobotic joint utilizing a pair of input rollers driving an intermediate or differential roller and ultimately a pitch/yaw roller, is illustrated in FIG. 10 together with an alternate means for mounting the traversing roller cam portion of the intermediate roller cam assembly for linear motion along the pitch axis.

Referring specifically to FIG. 10, wherein like components to FIG. 6 are designated by the prefix 40, a telerobotic manipulator joint 40 is shown as having two input roller assemblies 42 each driving a separate intermediate roller assembly 44, both of which drive a common pitch/yaw output roller 46. The first and second shafts S1 and S2 forming a part of the telerobotic manipulator joint 40 are identical orientation and configuration as those of the preceding embodiments. These shafts, S1 and S2 respectively, are coaxial with the pitch and yaw axes as illustrated in FIG. 10.

By way of simplification, the fixed roller cam portion 44D and traversing roller cam portion 44B of the intermediate roller cam assemblies 44, are equipped with tapered contours that work in conjunction with the cam balls 44H in the very same manner as the tapered contours in the traversing roller cam portion 34B and fixed roller cam portion 34D in the previous embodiment (see FIG. 6) to generate the varying thrust force. In addition, these tapered contours of the fixed roller cam portions 44D and traversing roller cam portions 44B each form an angular contact with the cam balls 44H. This angular contact not only generates the varying thrust force (as torque is transmitted between roller cam portions), but also works in conjunction with the pitch/yaw roller 46 to support the traversing roller cam portions 44B.

In operation, the embodiment of FIG. 10 is substantially identical to that described for FIG. 6 insofar as causing a variable loading between the reactive surfaces 44A of the traversing cam portions 44B of the intermediate roller assembly 44 and cooperating reactive surfaces 46D of the pitch/yaw output roller 46.

Figure 11:
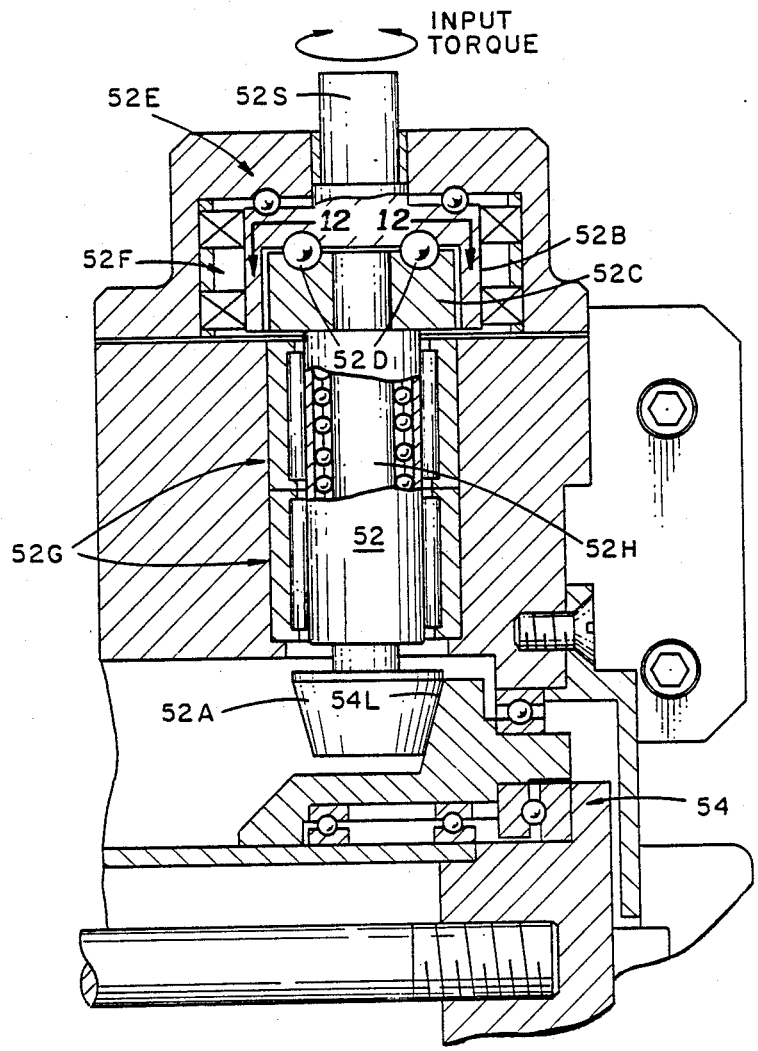

In order to provide a variable loading input roller configuration for telerobotic manipulator joints, the variable depth helical groove concept is shown in FIG. 11 as being applied to an input roller configuration to cause variable loading between the reactive surface 52A of an input roller assembly 52 and the reactive surface 54L on intermediate roller assembly 54. This reactive surface 54L corresponds to the reactive surfaces 44L on the fixed roller cam portion 44D of the intermediate roller assemblies 44 of the previous embodiments of FIGS. 6 and 10. It should be noted, however, that in the embodiment of FIG. 11 there is no attempt made to illustrate in detail a variable thrust intermediate roller assembly. Thus, the intermediate roller assembly 54 is merely schematically shown for the sake of simplicity of illustration.

Figure 12:
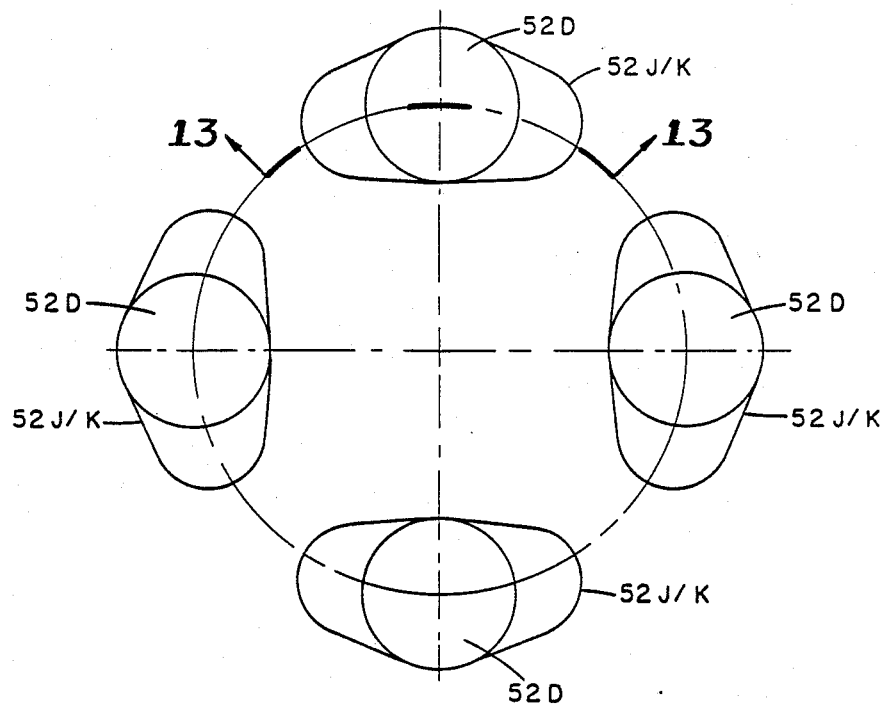
FIG. 12 is a schematic enlarged cam groove detail taken along line 12—12 of FIG. 11.
Figure 13:
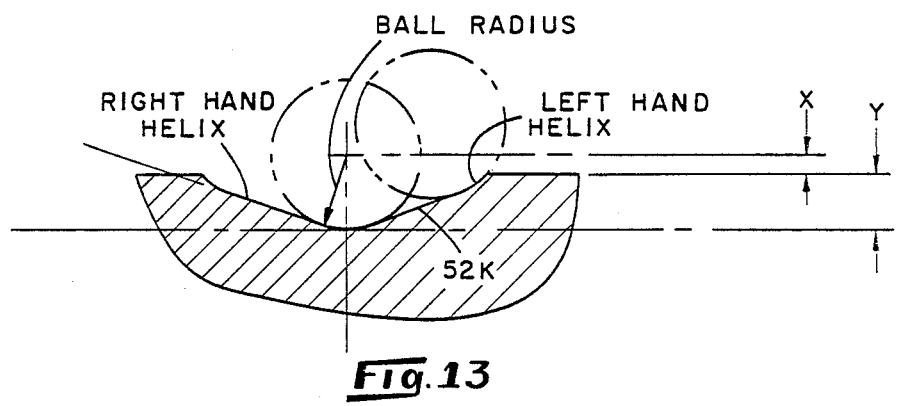
FIG. 13 is an enlarged cam groove detail in schematic form taken along line 13—13 of FIG. 12.
Figure 14:
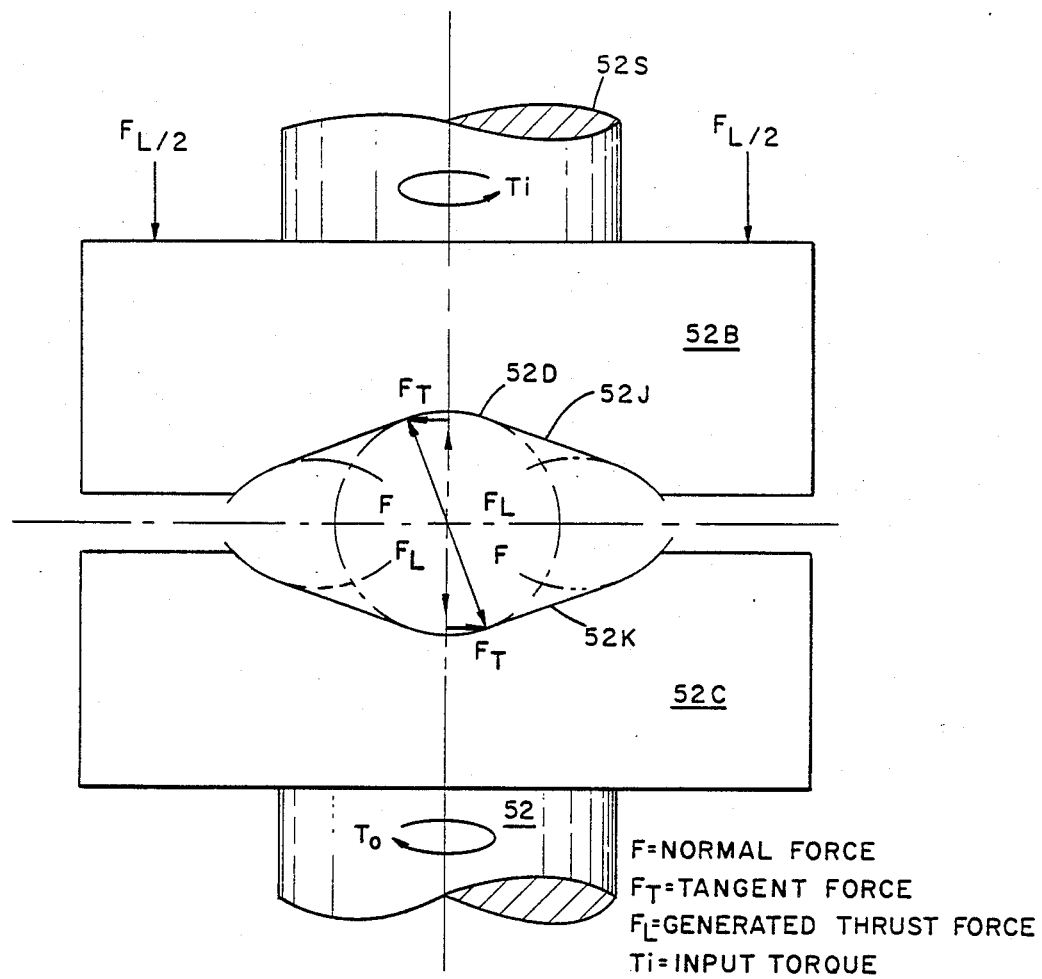
FIG. 14 is a free body diagram of the variable loading input roller of FIG. 11.

Referring now to FIGS. 11 and 14, the input roller assembly 52 is shown as including an input shaft 52S driving a cylindrical upper thrust cam 52B which receives in a cylindrical bore therein a lower thrust cam 52C which presents opposing surfaces normal to the axis of rotation of the input shaft 52S between which are trapped cam balls 52D in opposed helically ground variable depth cam grooves 52J and 52K, as best illustrated in FIG. 14. The varying depth of the left and right-hand helices utilized to form the grooves 52K are best illustrated in FIG. 13 and the array of cam balls 52D and grooves 52J/K are best illustrated in FIG. 12. As illustrated in FIG. 12 a cam ball and groove array comprises a preferred embodiment for the cam ball and groove arrays of this embodiment. This cam ball configuration is preferred as well for the embodiments of FIGS. 1, 6 and 10. The variable loading input roller assembly 52 generates a normal force through its reactive surface 52A against the reactive surface 54L of the intermediate roller assembly 54 which is proportional to the input torque. The linear ball and roller bearing assemblies 52G support the input roller shaft 52H and accommodates both rotation and linear motion.

As in the embodiment of FIG. 6, as has been further illustrated in conjunction with FIG. 8, and as now illustrated in conjunction with FIG. 13 each contour of the grooves 52J and 52K is formed by two helical grooves, one cut on a right-hand helix and the other cut on a left-hand helix. These two helical grooves converge at a depth that is slightly less than the cam ball radius.

Referring to the free body diagram of the variable loading input roller in FIG. 14, the input torque $T_i$ is shown as being transmitted through the input shaft 52S of the input roller assembly 52 to the upper thrust cam 52B and hence through the cam balls 52D and camming grooves 52J and 52K to the lower thrust cam 52C which generates output torque to the balance of the input roller assembly 52. The normal compressive force F, normal to the tangent of the helical groove, is the resultant force of the tangential force $F_T$ required to transmit the input torque $T_i$ and the varying thrust load force $F_L$ that is counteracted by the thrust bearing and bearing retainer assembly for the input roller 52 which is illustrated at 52E in FIG. 11. Journal bearings 52F for the input roller assembly together with linear ball and roller bearings 52G are also illustrated in FIG. 11. Referring back to FIG. 11, the thrust load produced in the input roller assembly 52 is transferred through the reactive surface 52A thereof to the reactive surface 54L of the intermediate roller assembly 54 in the manner described for the other embodiments of the present invention.

The foregoing specification and drawings illustrate that the present invention provides a traction differential drive mechanism with maximum efficiency regardless of load which is particularly well adapted for use in telerobotic manipulating arm joints. The structure of the present invention further results in minimum friction loss thresholds regardless of load for telerobots and allows the telerobotic arm to have a teleoperator sensitivity of optimum quality while maintaining the accuracy and stiffness necessary in that arm for high quality robotic operations. Thus, a teleoperator/robotic design has been effected by the present invention without the usual conflict between the methodologies ordinarily used for each.

The present invention having been thus described, it should be apparent that modifications could be made to the various components of the system, as would occur to one of ordinary skill in the art without departing from the spirit and scope of the present invention.

I claim:

1. Variable loading roller means for differential traction drives and the like comprising:
   input torque transmitting roller means for transmitting input torque and having a drive surface;
   output torque transmitting roller means having a drive surface engaged with and responsive to said input torque transmitting roller means for providing an output torque;
   said input torque transmitting roller means including variable loading means responsive to said input torque to cause said drive surfaces of said input and output torque transmitting roller means to be engaged with a resultant loading proportional to the torque transmitted thereby; said variable loading means comprising cam means for effecting said loading including a fixed cam portion and a transversing cam portion mounted for rotation about a common axis,
   said fixed cam portion being mounted for in place rotation about said common axis and said transversing cam portion including the said drive surface of said input roller means and being mounted for both rotation about said axis and axial displacement thereon relative to said fixed cam portion;
   complementary opposing reaction surface configurations formed in said cam portions; said complementary opposing reaction surface configuration being defined by at least one pair of surface grooves each defining right and left hand helical reaction surfaces converging at a central portion, said surface grooves being formed in surfaces of said cam portions parallel to the said common axis of said cam means and said helical reaction surfaces are defined by surface grooves of constant depth; and
   bearing means engaging and interacting with said reaction surface configurations, transmitting torque between said cam portions and generating an axial force from said fixed cam portion to said transversing cam portion as a function of said transmitted torque, said bearing means comprising a spherical cam ball mutually engaged in said surface grooves for transmitting torque to said traversing cam portion and generating a said axial force from the interaction of said cam ball and said helical reaction surfaces of said surface grooves.

2. In a differential traction drive means having a rotary drive surface engaging and transmitting torque to a driven surface, means for constraining a loading between said drive surface and said driven surface as a function of the torque transmitted thereby comprising:
   rotary input means for receiving and input torque including a fixed rotary portion and a traversing rotary portion on a common axis of rotation;
   said fixed rotary portion and traversing rotary portions comprising cam portions including complementary opposing reaction surface configurations defined by at least one pair of surface grooves each defining right and left helical reaction surfaces converging at a central portion formed therein; said surface grooves being formed in surfaces of said cam portions parallel to the said common axis of rotation and said helical reaction surfaces are defined by surface grooves of constant depth; said traversing rotary portion including said drive surface; and
   coupling means engaging and interacting with said fixed and traversing rotary portions to constrain displacement of said traversing rotary portion along said axis and impress said loading on said drive surface against said driven surface; said coupling means comprising bearing means engaging and interacting with said reaction surface configurations, transmitting torque between said cam portions and generating an axial force from said fixed portion to said traversing portion as a function of the said transmitted torque; said bearing means comprising a spherical cam ball mutually engaged in said surface grooves for transmitting torque to said traversing portion and generating a said axial force from the interaction of said cam ball and the helical reaction surfaces of said surface grooves.

3. In a differential traction drive means having a rotary drive surface engaging and transmitting torque to a driven surface, means for constraining a loading between said drive surface and said driven surface as a function of the torque transmitted thereby, comprising:
   rotary input means for receiving an input torque including a fixed rotary portion and a traversing rotary portion on a common axis of rotation;

said fixed rotary portion and traversing rotary portions comprising cam portions including complementary opposing reaction surface configurations defined by at least one pair of surface grooves each defining right and left helical reaction surfaces converging at a central portion formed therein; said surface grooves being formed in surfaces of said cam portions orthogonal to said common axis of rotation of said cam portions and said helical reaction surfaces are defined by surface grooves of varying depth; said traversing rotary portion including said drive surface; and coupling means engaging and interacting with said fixed and traversing rotary portions to constrain displacement of said traversing rotary portion along said axis and impress said loading on said drive surface against said driven surface; said coupling means comprising bearing means engaging and interacting with said reaction surface configurations, transmitting torque between said cam portions and generating an axial force from said fixed portion to said traversing portion as a function of the said transmitted torque; said bearing means comprising a spherical cam ball mutually engaged in said surface grooves for transmitting torque to said traversing portion and generating a said axial force from the interaction of said cam ball and the helical reaction surfaces of said surface grooves.

4. In a differential traction drive means having a rotary drive surface engaging and transmitting torque to a driven surface, means for constraining a loading between said drive surface and said driven surface as a function of the torque transmitted thereby, comprising:

rotary means for receiving an input torque including a fixed rotary portion and a traversing rotary portion on a common axis of rotation;

said fixed rotary portion and traversing rotary portions comprising cam portions including complementary opposing reaction surface configurations defined by at least one pair of surface grooves each defining right and left helical reaction surfaces converging at a central portion formed therein; said traversing rotary portion including said drive surface; and coupling means engaging and interacting with said fixed and traversing rotary portions to constrain displacement of said traversing rotary portion along said axis and impress said loading on said drive surface against said driven surface; said coupling means comprising bearing means engaging and interacting with said reaction surface configurations, transmitting torque between said cam portions and generating an axial force from said fixed portion to said traversing portion as a function of the said transmitted torque and providing means of support to said traversing portion; said bearing means comprising a spherical cam ball mutually engaged in said surface grooves for transmitting torque to said transversing portion and generating a aid axial force from the interaction of said cam ball and the helical reaction surfaces of said surface grooves.

* * * * *